United States Patent
Zhang et al.

(10) Patent No.: US 8,774,304 B1
(45) Date of Patent: *Jul. 8, 2014

(54) IMPLICIT MIMO ANTENNA SELECTION

(71) Applicant: Marvell International Ltd., Hamilton (BM)

(72) Inventors: Hongyuan Zhang, Fremont, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,514

(22) Filed: Apr. 22, 2013

Related U.S. Application Data

(63) Continuation of application No. 12/371,367, filed on Feb. 13, 2009, now Pat. No. 8,428,168.

(60) Provisional application No. 61/031,143, filed on Feb. 25, 2008.

(51) Int. Cl.
*H04B 7/02* (2006.01)

(52) U.S. Cl.
USPC .......................................................... 375/267

(58) Field of Classification Search
CPC .... H04B 7/061; H04B 7/0691; H04B 7/0417; H04B 7/0452; H04B 7/0626; H04L 1/0026; H04L 1/0693; H04L 25/0224; H04L 27/2601; H04L 5/0053; H04L 5/0023; H04L 5/0094; H04W 28/04
USPC .......................................................... 375/267
See application file for complete search history.

(56) References Cited

U.S. PATENT DOCUMENTS

| | | |
|---|---|---|
| 2007/0224943 A1 | 9/2007 | Gu et al. |
| 2009/0054093 A1* | 2/2009 | Kim et al. ............. 455/500 |
| 2009/0122777 A1 | 5/2009 | Tao et al. |
| 2009/0290563 A1 | 11/2009 | Gu et al. |
| 2011/0261860 A1 | 10/2011 | Zhang et al. |

FOREIGN PATENT DOCUMENTS

WO    WO-2006/031499 A3    7/2006

OTHER PUBLICATIONS

IEEE P802.11n™ /D3.00 Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput (Sep. 2007).
Zhang et al. "Applying Antenna Selection in WLANs for Achieving Broadband Multimedial Communications" IEEE Transactions on Bradcasting, vol. 52, No. 4, Dec. 2006.

(Continued)

*Primary Examiner* — Don N Vo

(57) ABSTRACT

A method in a first communication device configured to transmit data units to a second communication device via a forward link, and receive data units from the second communication device via a reverse link, includes transmitting, from the first communication device, consecutive sounding data units via the forward link. Each consecutive sounding data unit is transmitted via a different subset of antennas. The method also includes receiving, at the first communication device, CSI corresponding to the forward link that was generated at the second communication device and based on the consecutive sounding data units transmitted to the second communication device. The method also includes determining, at the first communication device, a subset of antennas to use in receiving data units via the reverse link. The subset of antennas to use in receiving data units via the reverse link is determined based on the CSI corresponding to the forward link.

20 Claims, 7 Drawing Sheets

(56) References Cited

OTHER PUBLICATIONS

U.S. Appl. No. 11/857,297, filed Sep. 18, 2007 entitled "Calibration Correction for Implicit Beamforming in a Wireless MIMO Communication System".

Non-Final Office Action in U.S. Appl. No. 12/371,367 dated Nov. 7, 2011.

Non-Final Office Action in U.S. Appl. No. 12/371,367 dated Mar. 22, 2012.

Final Office Action in U.S. Appl. No. 12/371,367 dated Aug. 10, 2012.

Notice of Allowance in U.S. Appl. No. 12/371,367 dated Dec. 24, 2012.

* cited by examiner

IMPLICIT MIMO ANTENNA SELECTION

CROSS-REFERENCE TO RELATED APPLICATIONS

This application is a continuation of U.S. patent application Ser. No. 12/371,367, now U.S. Pat. No. 8,428,168, entitled "Implicit MIMO Antenna Selection" and filed on Feb. 13, 2009, which claims the benefit of U.S. Provisional Patent Application No. 61/031,143, entitled "Implicit MIMO Antenna Selection" and filed on Feb. 25, 2008, the entire disclosures of which are hereby incorporated by reference herein.

FIELD OF THE DISCLOSURE

The present invention relates generally to wireless communication systems and, more particularly, to antenna selection in a multiple antenna transceiver.

BACKGROUND

An ever-increasing number of relatively inexpensive, low power wireless data communication services, networks and devices have been made available over the past number of years, promising near wire speed transmission and reliability. Various wireless technologies are described in detail in the 802.11 IEEE Standard, including for example, the IEEE Standard 802.11 (1999) and its updates and amendments, the IEEE Standard 802.11a/g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" 11 Mbps mobile wireless transmission standard.

Generally speaking, transmission systems compliant with the IEEE 802.11a and 802.11g or "802.11a/g" standards as well as the 802.11n standard achieve their high data transmission rates using Orthogonal Frequency Division Modulation or OFDM encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To increase the number of signals which may be propagated in a communication system and/or to compensate for deleterious effects associated with multiple propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the different transmit and receive antennas to form separate spatial channels on which additional information is sent, better reception properties can be obtained in a MIMO system by using each of the various transmit antennas of the MIMO system to transmit the same signal while phasing (and amplifying) this signal as it is provided to the various transmission antennas to achieve beamforming (also referred to as "beamsteering"). Generally speaking, beamforming creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better reception reliability between a particular transmitter and a particular receiver, over that obtained by single transmitter-antenna/receiver-antenna systems.

In order to utilize multiple antennas, however, multiple radio frequency (RF) chains (e.g., amplifiers, mixers, analog-to-digital converters, etc.) are required, which increases costs. As a compromise to help reduce costs, a larger number of antennas, as compared to the number of RF chains, may be employed. In such an implementation, an optimal subset of the antennas may be selected, such as selecting a subset of antennas that provides the highest capacity or the lowest bit error rate. This technique is often referred to as "antenna selection." In other words, with MIMO systems that utilize antenna selection, there are less RF chains than antennas, and not all of the antennas are used. Rather, only the "best" antennas are used.

SUMMARY

In an embodiment, a method in a first communication device configured to (i) transmit data units to a second communication device via a forward link, and (ii) receive data units from the second communication device via a reverse link, includes transmitting, from the first communication device, a plurality of consecutive sounding data units via the forward link. Each consecutive sounding data unit is transmitted via a different subset of antennas. The method also includes receiving, at the first communication device, channel state information (CSI) corresponding to the forward link. The CSI corresponding to the forward link was generated (i) at the second communication device and (ii) based on the plurality of consecutive sounding data units transmitted to the second communication device. The method also includes determining, at the first communication device, a subset of antennas to use in receiving data units via the reverse link. The subset of antennas to use in receiving data units via the reverse link is determined based on the CSI corresponding to the forward link.

In another embodiment, an apparatus configured to (i) transmit data units to a communication device via a forward link, and (ii) receive data units from the communication device via a reverse link, includes a transceiver configured to cause a different subset of antennas to be coupled by a switch device to a set of transmit radio frequency chains as each of a plurality of consecutive sounding data units is transmitted via the forward link. The transceiver is also configured to receive channel state information (CSI) corresponding to the forward link. The CSI corresponding to the forward link was generated (i) at the communication device and (ii) based on the plurality of consecutive sounding data units transmitted to the communication device. The transceiver is also configured to determine, based on the CSI corresponding to the forward link, a subset of antennas to use in receiving data units from the communication device via the reverse link.

In another embodiment, a nontransitory computer-readable medium includes instructions that, when executed by one or more processors, cause the one or more processors to cause a plurality of consecutive sounding data units to be transmitted via a forward link from a first communication device to a second communication device. Each consecutive sounding data unit is transmitted via a different subset of antennas. The instructions also cause the one or more processors to determine a subset of antennas to use in receiving data units via a reverse link from the second communication device to the first communication device. The subset of antennas to use in receiving data units via the reverse link is determined based on CSI corresponding to the forward link. The CSI corresponding to the forward link was generated (i) at the second communication device and (ii) based on the plurality of consecutive sounding data units transmitted to the second communication device.

DETAILED DESCRIPTION

While the antenna selection techniques described herein are in the context of communication systems that operate according to the IEEE Standard 802.11n now being standardized, these techniques may be used in various other types of wireless communication systems that utilize antenna selection and are not limited to those conforming to the IEEE Standard 802.11n. For example, the antenna selection techniques described herein may be utilized in systems that conform to one of the IEEE 802.16 family of standards or the Long Term Evolution (LTE) standard of the Third Generation Partnership Project (3GPP), in MIMO code-division multiple access (CDMA) systems, etc.

Figure 1:
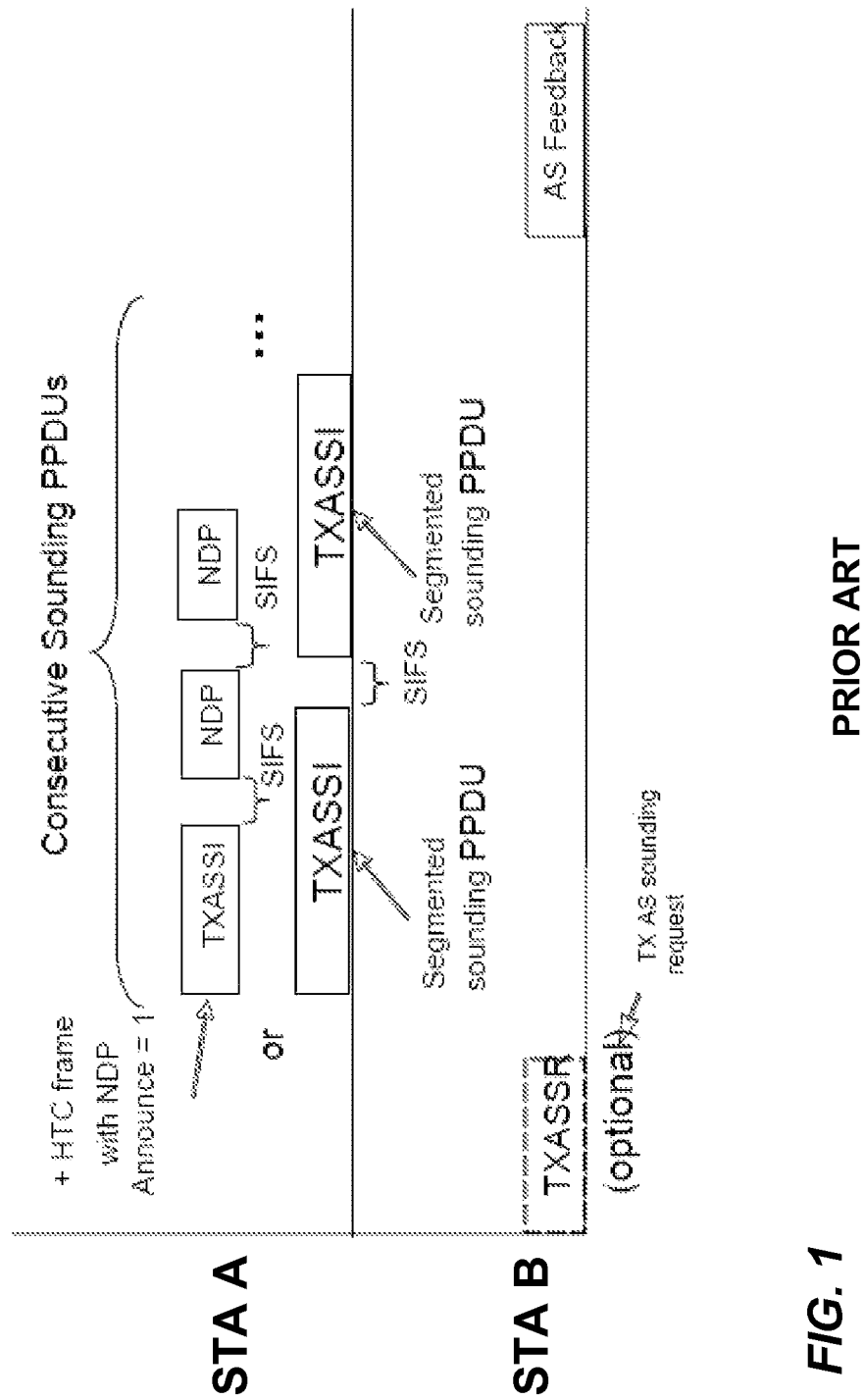
FIG. 1 is a diagram illustrating a prior art method for performing transmit antenna selection.

FIG. 1 is a diagram illustrating a method specified in the IEEE 802.11n Standard for performing transmit antenna selection for a station A (STA A). In FIG. 1, it is assumed that STA A has more antennas than transmit RF chains. STA A transmits a consecutive series of sounding data units, such as a plurality of transmit antenna selection sounding indications (TXASSIs) or a single TXASSI with the null data packet (NDP) announcement field set to one in the high throughput control (HTC) field (also referred to as the +HTC field or frame), followed by one or more NDPs, to a station B (STA B). Each sounding data unit is transmitted using a different subset of antennas, and sounding data units are spaced apart by a short interframe space (SIFS). The consecutive sounding data units are used to sound the full-size channel with all transmit antennas. STA B then calculates a full-size CSI based on the received sounding data units. Next, STA B transmits the CSI to STA A as antenna selection (AS) feedback, and STA A uses the CSI to determine a "best" subset of TX antennas for STA A that is optimal in some sense, such as providing the highest channel capacity taking into consideration the signal-to-noise ratio, or a lowest error rate (e.g., a lowest bit error rate (BER)).

Alternatively, STA B may use the determined CSI to determine the "best" subset of TX antennas for STA A (i.e., a selected subset of TX antennas). Then, STA B may transmit an indication of the selected subset of TX antennas to STA A as the AS feedback. For example, STA B may transmit antenna indices corresponding to the selected subset of TX antennas as the AS feedback. As indicated in FIG. 1, STA B optionally may cause STA A to transmit the plurality of sounding data units by transmitting a transmit antenna selection sounding request to STA A.

Figure 2:
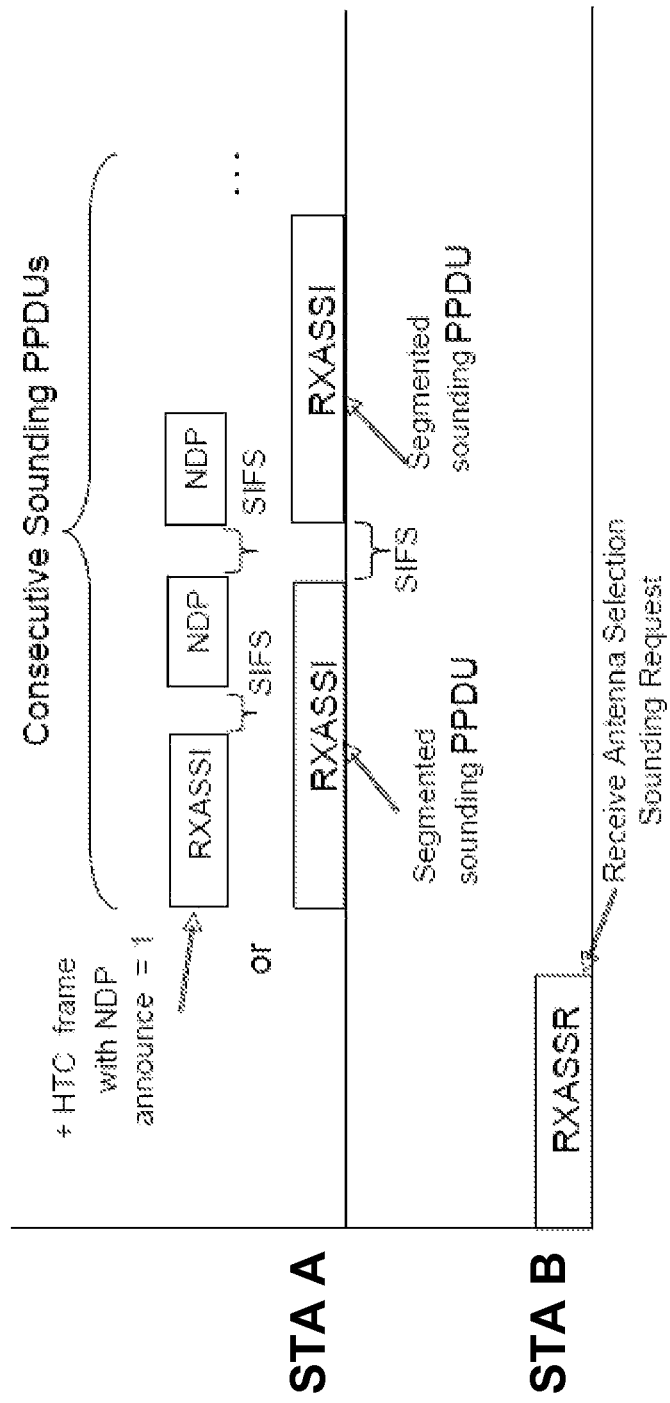
FIG. 2 is a diagram illustrating a prior art method for performing receive antenna selection.

FIG. 2 is a diagram illustrating a method specified in the IEEE 802.11n Standard for performing receive antenna selection for STA B. In FIG. 2, it is assumed that STA B has more antennas than receive RF chains.

First, STA B transmits a receive antenna selection sounding request (RXASSR) to STA A. In response, STA A transmits a consecutive series of sounding data units, such as a plurality of receive antenna selection sounding indications (RXASSIs) or a single RXASSI with the NDP announcement field set to one in the +HTC field, followed by one or more NDPs, to STA B. Each sounding data unit is received by STA B using a different subset of antennas at STA B, and the sounding data units are spaced apart by the SIFS. The consecutive sounding data units are used to sound the full-size channel with all receive antennas. STA B then calculates a full-size CSI based on the received sounding data units. Next, STA B uses the CSI to determine a "best" subset of RX antennas for STA B that is optimal in some sense, such as providing the highest channel capacity taking into consideration the SNR, or a lowest error rate (e.g., a lowest BER).

The methods described with respect to FIGS. 1 and 2 utilize "explicit" channel sounding. For instance, in order to perform TX antenna selection, sounding packets must be transmitted by the TX antennas. Similarly, in order to perform RX antenna selection, sounding packets must be received by the RX antennas. Thus, for a transceiver that employs both TX and RX antenna selection, two antenna selection training cycles (i.e., as illustrated in FIGS. 1 and 2) must be employed. Additionally, the TX antenna selection method described with respect to FIG. 1 requires that STA B must be capable of feeding back CSI or performing ASEL computation.

Described in more detail below is a method for performing TX ASEL which may be referred to as implicit TX ASEL. Implicit TX ASEL may be utilized in transceivers capable of both TX and RX antenna selection. The wireless channel is typically reciprocal or nearly reciprocal in the "forward" and "reverse" directions. Thus, in implicit TX ASEL, the transceiver requests sounding packets from the other station and uses the transpose of the estimated channel in the reverse link to compute the TX ASEL for the forward link. The transceiver also may compute Rx ASEL in the same sounding cycle.

Implicit TX ASEL can utilize the current 802.11n RX ASEL sounding protocol, and is transparent to the other station (which treats the process as RX ASEL sounding). With implicit TX ASEL, the other station need only be capable of transmitting sounding packets. Thus, transceivers that implement implicit TX ASEL may be used with other less complex stations as compared to explicit TX ASEL.

As will be described in more detail below, calibration may be utilized to account for different TX and RX chains and/or different antenna/RF chain connections that are not reciprocal in the forward and reverse directions.

Also described in more detail below is a method for performing RX ASEL which may be referred to as implicit RX ASEL. Implicit RX ASEL may be utilized in transceivers capable of both TX and RX antenna switching. In implicit RX ASEL, the transceiver initiates TX ASEL sounding cycle with a CSI feedback request (similar to the method described with respect to FIG. 1), and the transpose of the estimated full-size channel in the forward link is used to compute the RX ASEL in the reverse link. The transceiver may compute TX ASEL using the same sounding cycle.

Implicit RX ASEL can utilize the current 802.11n TX ASEL sounding protocol, and is transparent to the other station (which treats the process as TX ASEL sounding).

Before discussing the implicit TX ASEL and implicit RX ASEL methods further, an example channel model will now be described with respect to STA A and STA B. In this model, STA A has $M_A$ antennas, and $N_A$ TX and RX RF chains, where $M_A > N_A$. STA B has $N_B$ antennas and RF chains (i.e., the model assumes that no ASEL is applied at STA B). Let $L = \lceil M_A / N_A \rceil$ be the number of disjoint antenna subsets. The equivalent forward channel (from A to B) for the i-th antenna subset at STA A is:

$$\tilde{H}_{A_iB} = B^{(RX)} H_{A_iB} A_i^{(TX)} \qquad \text{(Equ. 1)}$$

where $\tilde{H}_{A_iB}$ is the equivalent channel at baseband, $H_{A_iB}$ is the "over-the-air channel" in forward link, satisfying $H_{A_iB} = H_{BA_i}^T$, $A_i^{(TX)}$ is the transmit RF chain response at STA A, and $B^{(RX)}$ is the receive RF chain response at STA B. Usually the RF chain response matrices are diagonal matrices, assuming sufficient separation between chains and antennas (i.e., low "coupling").

Similarly, the equivalent reverse channel (from B to A) for the i-th antenna subset at STA A is:

$$\tilde{H}_{BA_i} = A_i^{(RX)} H_{BA_i} B^{(TX)} \qquad \text{(Equ. 2)}$$

The full-size channels in the two directions are:

$$\tilde{H}_{AB} = [\tilde{H}_{A_1B} \ldots \tilde{H}_{A_LB}] = B^{(RX)} H_{AB} \text{blockdiag}\{A_1^{(TX)} \ldots A_L^{(TX)}\} \qquad \text{(Equ. 3)}$$

$$\tilde{H}_{BA} = \begin{bmatrix} \tilde{H}_{A_1B} \\ \vdots \\ \tilde{H}_{A_LB} \end{bmatrix} = \text{blockdiag}\{A_1^{(RX)} \ldots A_L^{(RX)}\} H_{BA} B^{(TX)} \qquad \text{(Equ. 4)}$$

Assuming calibration (which will be described below) is applied, the calibrated channel matrices may be denoted by:

$$\hat{H}_{AB} = [\hat{H}_{A_1B} \ldots \hat{H}_{A_LB}] \qquad \text{(Equ. 5)}$$

$$\hat{H}_{BA} = \begin{bmatrix} \hat{H}_{A_1B} \\ \vdots \\ \hat{H}_{A_LB} \end{bmatrix} \quad \text{(Equ. 6)}$$

The calibrated channels are fully reciprocal if:

$$\hat{H}_{A_iB} = \rho_i \hat{H}_{BA_i} \text{ and } \hat{H}_{AB} = \rho \hat{H}_{BA}^T \quad \text{(Equ. 7)}$$

where $\rho_i$ and $\rho$ are scalars. The calibrated channels are semi-reciprocal if:

$$\hat{H}_{A_iB} = D_i \hat{H}_{AB_i}^T \text{ and } \hat{H}_{AB} = D\hat{H}_{BA}^T \quad \text{(Equ. 8)}$$

where $D_i$ and $D$ are diagonal matrices.

Figure 3:
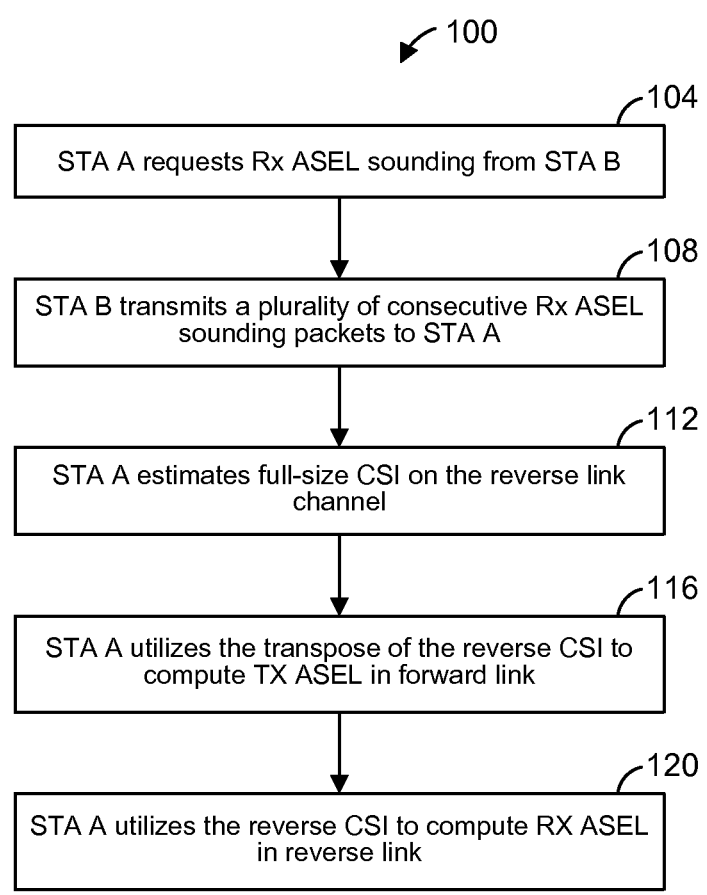
FIG. 3 is a flow diagram of an example method for performing implicit transmit antenna selection.

FIG. 3 is a flow diagram of an example method 100 for performing implicit TX ASEL. At block 104, STA A may request that STA B transmit a plurality of consecutive RX ASEL sounding data units. In the context of the IEEE 802.11n Standard, for example, STA A may transmit an RXASSR to STA B. At block 108, STA B responds to the request at block 104 by sending a plurality of consecutive sounding data units. In the context of the IEEE 802.11n Standard, for example, STA B may transmit a plurality of RXASSIs or a single RXASSI followed by one or more NDPs (see FIG. 2) to STA B. STA A may then receive each sounding data unit using a different antenna subset.

At block 112, STA A may generate an estimate of the full-size CSI on the reverse link channel. The CSI generated at block 112 may be calibrated (i.e., $\hat{H}_{BA}$) (to be described below) or uncalibrated, but utilizing calibration will tend to provide improved antenna selection as compared to not using calibration. At block 116, STA A may utilize the transpose of the full-size CSI on the reverse link channel (calibrated or uncalibrated) to compute TX ASEL in the forward link, assuming reciprocity. If calibration is utilized, block 116 may be represented as:

$$T_A = f_T(\hat{H}_{BA}^T) \quad \text{(Equ. 9)}$$

where $f_T$ is a transmit antenna selection function and $T_A$ is the selected TX antenna subset. Any of a variety of antenna selection functions, including currently known antenna selection functions, may be utilized such as functions that select based on maximizing capacity taking into consideration SNR, functions that select based on minimizing an error rate, etc.

Optionally, at block 120, STA A may utilize the full-size CSI on the reverse link channel (calibrated or uncalibrated) to compute RX ASEL in the reverse link. If calibration is utilized, block 120 may be represented as:

$$R_A = f_R(\hat{H}_{BA}) \quad \text{(Equ. 10)}$$

where $f_R$ is a receive antenna selection function and $R_A$ is the selected RX antenna subset. Any of a variety of antenna selection functions, including currently known antenna selection functions, may be utilized such as functions that select based on maximizing capacity taking into consideration SNR, functions that select based on minimizing an error rate, etc. The antenna selection functions $f_T$ and $f_R$ may be the same or different functions.

As can be seen in FIG. 3, one TX ASEL and, optionally, one RX ASEL at STA A can be supported by STA B by sending a single set of RX ASEL consecutive sounding data units.

In the example method 100, $T_A$ and $R_A$ may be different. This may be caused by different antenna selection functions $f_T$ and $f_R$, by residual RF mismatch, and/or due to lack of calibration, for example.

Figure 4:
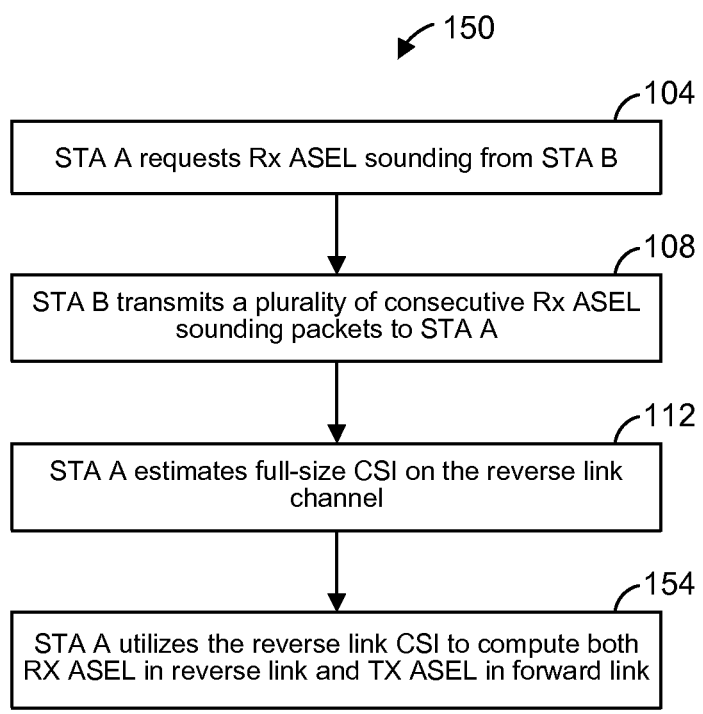
FIG. 4 is a flow diagram of an example method for performing implicit transmit antenna selection and explicit receive antenna selection.

FIG. 4 is a flow diagram of another example method 150 for performing implicit TX ASEL. Blocks 104, 108 and 112 are the same as in the method 100 of FIG. 3 and will thus not be further described. At block 154, STA A utilizes the reverse link CSI generated at block 112 to determine both TX ASEL for the forward link and RX ASEL for the reverse link. For example, TX ASEL for the forward link and RX ASEL for the reverse link may be computed as described with respect to blocks 116 and 120 of FIG. 3. If it is assumed, however, that calibration has been performed, then STA A may implement only one of blocks 116 and 120 of FIG. 3, and then set $T_A = R_A$. If Equ. 7 or Equ. 8 is satisfied, the optimal selection in one direction (i.e., in the forward link or the reverse link) is optimal or near-optimal for the other direction.

Figure 5:
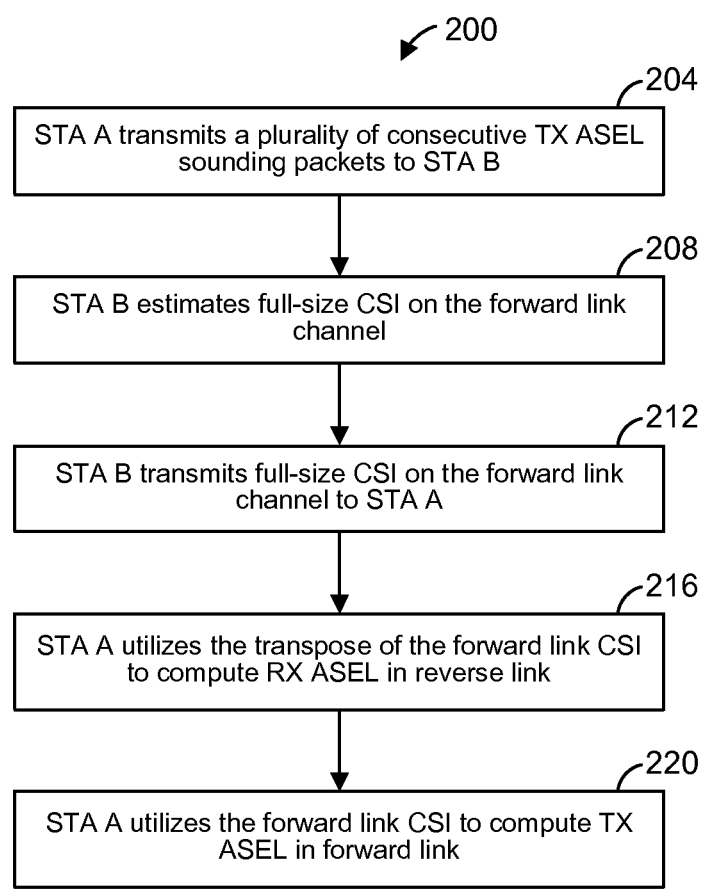
FIG. 5 is a flow diagram of an example method for performing implicit receive antenna selection.

FIG. 5 is a flow diagram of an example method 200 for performing implicit RX ASEL. At block 204, STA A sends a plurality of consecutive sounding data units to STA B. In the context of the IEEE 802.11n Standard, for example, STA A may initiate a TX ASEL sounding cycle by transmitting a plurality of TXASSIs or a single TXASSI followed by one or more NDPs (see FIG. 1) to STA B. STA A transmits each sounding data unit using a different antenna subset.

At block 208, STA B may generate an estimate of the full-size CSI on the forward link channel. The CSI generated at block 208 may be calibrated (i.e., $\hat{H}_{AB}$) (to be described below) or uncalibrated, but utilizing calibration will tend to provide improved antenna selection as compared to not using calibration. At block 212, STA B may transmit the estimate of the full-size CSI on the forward link channel to STA A. In the context of the IEEE 802.11n Standard, for example, STA B may transmit the full-size CSI on the forward link channel as antenna selection feedback.

At block 216, STA A may utilize the transpose of the full-size CSI on the forward link channel (calibrated or uncalibrated) to compute RX ASEL in the reverse link, assuming reciprocity. If calibration is utilized, block 216 may be represented as:

$$R_A = f_R(\hat{H}_{AB}^T) \quad \text{(Equ. 11)}$$

where $f_R$ is a receive antenna selection function and $R_A$ is the selected RX antenna subset. Any of a variety of antenna selection functions, including currently known antenna selection functions, may be utilized such as functions that select based on maximizing capacity taking into consideration SNR, functions that select based on minimizing an error rate, etc.

Optionally, at block 220, STA A may utilize the full-size CSI on the forward link channel (calibrated or uncalibrated) to compute TX ASEL in the forward link. If calibration is utilized, block 220 may be represented as:

$$T_A = f_T(\hat{H}_{AB}) \quad \text{(Equ. 12)}$$

where $f_T$ is a transmit antenna selection function and $T_A$ is the selected TX antenna subset. Any of a variety of antenna selection functions, including currently known antenna selection functions, may be utilized such as functions that select based on maximizing capacity taking into consideration SNR, functions that select based on minimizing an error rate, etc. The antenna selection functions $f_T$ and $f_R$ may be the same or different functions.

As can be seen in FIG. 5, one RX ASEL and, optionally, one TX ASEL at STA A can be supported by STA B by sending a single set of RX ASEL consecutive sounding data units.

Figure 6:
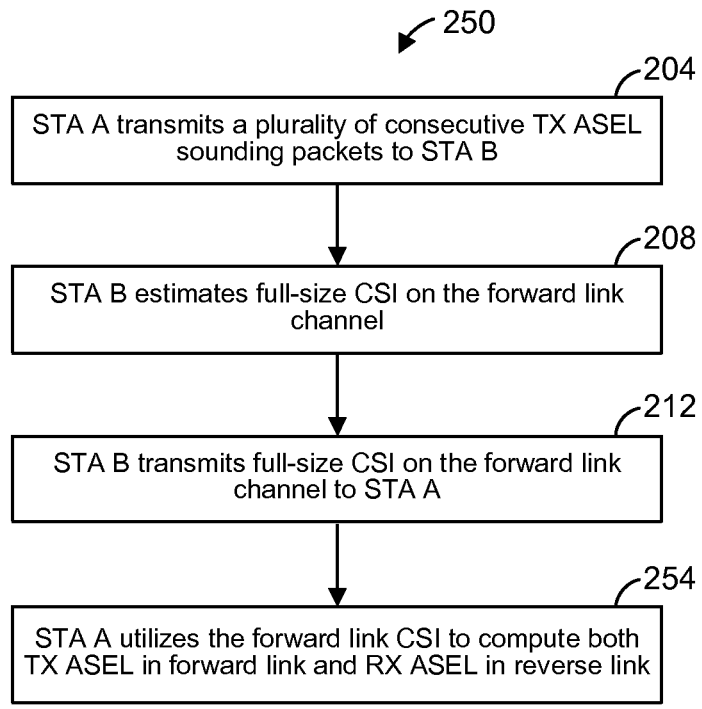
FIG. 6 is a flow diagram of an example method for performing implicit receive antenna selection and explicit transmit antenna selection.

FIG. 6 is a flow diagram of another example method 250 for performing implicit TX ASEL. Blocks 204, 208 and 212 are the same as in the method 100 of FIG. 5 and will thus not be further described. At block 254, STA A utilizes the forward link CSI generated at block 208 to determine both RX ASEL for the reverse link and TX ASEL for the forward link. For example, TX ASEL for the forward link and RX ASEL for the reverse link may be computed as described with respect to blocks 216 and 220 of FIG. 5. If it is assumed, however, that calibration has been performed, then STA A may implement only one of blocks 216 and 220 of FIG. 5, and then set $T_A = R_A$. If Equ. 7 or Equ. 8 is satisfied, the optimal selection in one direction (i.e., in the forward link or the reverse link) is optimal or near-optimal for the other direction.

Although the example implicit antenna selection methods were described above in the context of a STA A capable of antenna selection communicating with a STA B not capable of antenna selection, it will be understood by those of ordinary skill in the art that implicit antenna selection methods may also be utilized when both STA A and STA B have TX/Rx ASEL capabilities. For example, when STA A is implementing implicit TX ASEL, STA B may transmit all of the sounding data units using a fixed subset of transmit antennas. Similarly, when STA A is implementing implicit RX ASEL, STA B may receive all of the sounding data units using a fixed subset of receive antennas.

Additionally, although the example implicit antenna selection methods were described above in the context of a STA A having a same number of TX and RX RF chains, one of ordinary skill in the art will understand that these methods can be extended to the case where STA A has different numbers of RX and TX RF chains. For example, when the number of RX chains is greater than the number of TX chains, then the number of RX chains employed for implicit ASEL could be limited to the number of TX chains. Similarly, when the number of TX chains is greater than the number of RX chains, then the number of TX chains employed for implicit ASEL could be limited to the number of RX chains.

Example methods for calibration will now be described. Calibration techniques such as the calibration techniques described below, when used in conjunction with implicit antenna selection techniques such as described above may help improve antenna selection performance.

RF imbalance between TX and RX RF chains may degrade the CSI estimation used for implicit ASEL as well as for other purposes such as implicit transmit beamforming. Additionally, possible RF imbalances between different antenna/RF chain combinations may also introduce CSI inaccuracy, which may degrade ASEL in general, i.e., both explicit and implicit ASEL. To optimize the performance of implicit ASEL, example calibration methods to address the above two types of impairments are described below.

The RF response matrices at STA A can be expressed as:

$$A_l^{(TX)} = \text{diag}\{a_{1,l\_1}^{(TX)} \quad a_{2,l\_2}^{(TX)} \quad \ldots \quad a_{N_A,l\_N_A}^{(TX)}\} \quad \text{(Equ. 13)}$$

$$A_l^{(RX)} = \text{diag}\{a_{1,l\_1}^{(RX)} \quad a_{2,l\_2}^{(RX)} \quad \ldots \quad a_{N_A,l\_N_A}^{(RX)}\} \quad \text{(Equ. 14)}$$

where $a_{l,i\_j}^{(TX)}$ is the TX RF response of connecting the l-th TX RF chain to the j-th antenna in the i-th antenna subset.

TX/RX RF imbalance causes $a_{l,i\_j}^{(TX)} \ne a_{l,i\_j}^{(RX)}$; and the antenna/RF chain imbalance (if there is any) causes $a_{l,i\_j_1}^{(TX)} \ne a_{l,i\_j_2}^{(TX)}$ and $a_{l,i\_j_1}^{(RX)} \ne a_{l,i\_j_2}^{(RX)}$ (i.e. the RF response when connecting an RF chain to a different antenna is different). The first RF imbalance degrades the accuracy of CSI used for calculating ASEL, obtained in the other direction (i.e. implicit ASEL); the 2nd imbalance degrades the accuracy of CSI for any ASEL (i.e., explicit or implicit), because the same antenna may be connected to different RF chains during sounding and during data transmission after antenna switching.

An illustrative example will now be described in the context of implicit TX ASEL. In this example, $N_A = 2$, $M_A = 4$, and $L = 2$.

$$\tilde{H}_{BA_1} = \begin{bmatrix} a_{1,1\_1}^{(RX)} & \\ & a_{2,1\_2}^{(RX)} \end{bmatrix} H_{BA_1} B^{(TX)} \quad \text{(Equ. 15)}$$

$$\tilde{H}_{BA_2} = \begin{bmatrix} a_{1,2\_1}^{(RX)} & \\ & a_{2,2\_2}^{(RX)} \end{bmatrix} H_{BA_2} B^{(TX)} \quad \text{(Equ. 16)}$$

where $\tilde{H}_{BA_1}$ corresponds to the equivalent channel at baseband for the first antenna subset, $H_{BA_1}$ is the "over-the-air channel" for the first antenna subset, $\tilde{H}_{BA_2}$ corresponds to the equivalent channel at baseband for the second antenna subset, and $H_{BA_2}$ is the "over-the-air channel" for the second antenna subset. Assuming perfect TX/Rx RF imbalance calibration (i.e., $a_{l,i\_j}^{(TX)} = a_{l,i\_j}^{(RX)}$):

$$\hat{H}_{BA} = \quad \text{(Equ. 17)}$$

$$[\tilde{H}_{BA_1}^T \quad \tilde{H}_{BA_2}^T] = B^{(TX)} H_{BA}^T \begin{bmatrix} a_{1,1\_1}^{(TX)} & & & \\ & a_{2,1\_2}^{(TX)} & & \\ & & a_{1,2\_1}^{(TX)} & \\ & & & a_{2,2\_2}^{(TX)} \end{bmatrix}$$

If the first and third TX antennas are selected, then:

$$\tilde{H}_{A_{SL}B} = \text{squeeze}\left\{ B^{(RX)} H_{AB} \begin{bmatrix} a_{1,1\_1}^{(TX)} & & & \\ & 0 & & \\ & & a_{2,2\_1}^{(TX)} & \\ & & & 0 \end{bmatrix} \right\} = \quad \text{(Equ. 18)}$$

$$B^{(RX)} H_{AB} \begin{bmatrix} a_{1,1\_1}^{(TX)} & \\ & a_{2,2\_1}^{(TX)} \end{bmatrix}$$

where $\tilde{H}_{A_{SL}B}$ corresponds to the equivalent channel at baseband for the selected antenna subset. As can be seen in Equ. 18, an imbalance is caused when $a_{1,2\_1}^{(TX)} \ne a_{2,2\_1}^{(TX)}$, i.e., antenna 2_1 is connected to different chains during sounding and data transmission.

In one calibration technique, self RF calibration may be conducted so that the reciprocity condition of Equ. 7 and Equ. 8 can be maintained under any antenna switching configuration.

Two-fold calibration may be utilized if the RF response is dependent on antenna-RF chain connections. A first calibration should attempt to satisfy $a_{l,i\_j_1}^{(TX/RX)} = a_{l,i\_j_2}^{(TX/RX)}$, $\forall i$, $j_1, j_2$, i.e., each RF chain presents a fixed RF response regardless of the antenna to which it is connected; or $a_{l_1,i\_j}^{(TX/RX)} =$ $a_{l_2,i\_j}^{(TX/RX)}$, $\forall l_1, l_2$, i.e., each antenna presents a fixed RF response regardless of the RF chain to which it is connected. A second calibration should attempt to satisfy $a_{l,i\_j}^{(TX)} = \rho \, a_{l,i\_j}^{(RX)}$, so Equ. 7 or Equ. 8 is guaranteed. This two-fold calibration attempts minimize distortion of the CSI used for implicit ASEL under any antenna switching status.

In another calibration technique, "over-the-air" calibration may be utilized. When an RF response is not dependent on the antenna elements, a calibration protocol/computation may be employed once when the $N_A$ RF chains of STA A are connected to any antenna subset in order to generate one or more calibration correction matrices. Then, during sounding or data transmission, the calibration correction matrices may be applied at TX or RX baseband. Examples of such calibration techniques are described in U.S. patent application Ser. No. 11/857,297, filed on Sep. 18, 2007, entitled "Calibration Correction for Implicit Beamforming in a Wireless MIMO Communication System," (hereinafter referred to as "MP1327") which is hereby incorporated by reference herein, as well as the IEEE 802.11n Standard Draft 3.0, which is hereby incorporated by reference herein. Using such calibration techniques helps to make $\hat{H}_{A,B} = D\hat{H}_{BA_i}$ or $\hat{H}_{A,B} = \rho \hat{H}_{BA_i}$ with fixed D or $\rho$, in an attempt to meet Equ. 7 or Equ. 8.

On the other hand, when an RF response is dependent on the antenna elements, a calibration protocol/computation may be employed for every disjoint antenna subset used during receiving or transmitting the sounding packets in the Rx or TX ASEL sounding cycle. This can be done, for example, by initiating L calibration training cycles such as described in MP1327 at STA A. In each such calibration training cycle, a different one of the L disjoint antenna subsets is connected to the RX and TX chains of STA A. When calculating the calibration correction matrices, STA A should refer to the same antenna(s) at STA B, so that $\rho_i = \rho$, $\forall i$ in Equ. 7, or $D_i = D$, $\forall i$ in Equ. 8. Thus, if $\hat{H}_{A,B} = \rho \hat{H}_{BA_i}^T$ or $\hat{H}_{A,B} = D\hat{H}_{BA_i}$, Equ. 7 or Equ. 8 can be met.

Next, a calibration method such as described in H. Zhang, A. F. Molisch, J. Zhang, "Applying antenna selection in WLANs for achieving broadband multimedia communications," IEEE Trans. Broadcasting, vol. 52, no. 4, December 2006, which is hereby incorporated by reference herein, at both the TX and RX sides of STA A, so that whenever an antenna is connected to an RF chain for receiving/transmitting a signal, it presents the same receive/transmit RF response as when it is connected to the RF chain during the RX or TX ASEL sounding cycles above. For example, if the j-th antenna of the i-th subset is connected to the l-th receive chain on receiving the i-th sounding packet in an implicit TX ASEL sounding cycle, calibration is applied such that the following is maintained when the same antenna is connected to any Tx/Rx RF chain—then distortion is reduced:

$$a_{l,i\_j}^{(RX)} \doteq a_{l',i\_j}^{(RX)}, \; \forall l' \neq l \text{ and } a_{l,i\_j}^{(TX)} \doteq a_{l',i\_j}^{(TX)}, \; \forall l' \neq l \quad \text{(Equ. 19)}$$

Figure 7:
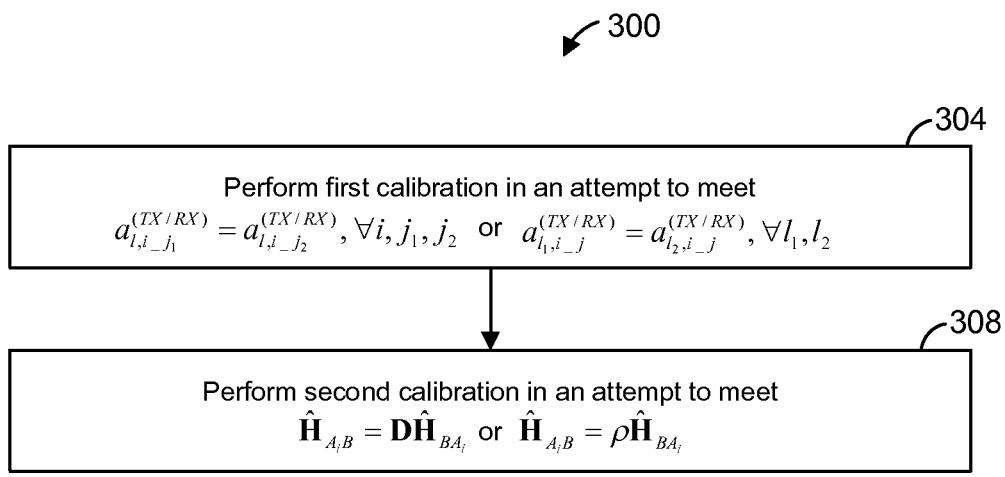
FIG. 7 is a flow diagram of an example method for performing calibration useful in implicit antenna selection.

FIG. 7 is a flow diagram of an example method 300 for performing calibration in conjunction with implicit ASEL. At block 304, a first calibration is performed in an attempt to satisfy $a_{l,i\_j_1}^{(TX/RX)} = a_{l,i\_j_2}^{(TX/RX)}$, $\forall i, j_1, j_2$, i.e., each RF chain presents a fixed RF response regardless of the antenna to which it is connected; or $a_{l_1,i\_j}^{(TX/RX)} = a_{l_2,i\_j}^{(TX/RX)}$, $\forall l_1, l_2$, i.e., each antenna presents a fixed RF response regardless of the RF chain to which it is connected. Examples of calibration techniques that may be utilized to implement block 304, such as self-calibration and "over-the-air" calibration techniques, were described previously. At block 308, a second calibration is performed in an attempt to satisfy $\hat{H}_{A,B} = \rho \hat{H}_{BA_i}^T$ or $\hat{H}_{A,B} = D\hat{H}_{BA_i}$. Examples of calibration techniques that may be utilized to implement block 308, such as self-calibration and "over-the-air" calibration techniques, were described previously.

Although the example method 300 refers to performing a first calibration and a second calibration, it will be understood that the order in which the two calibrations are performed may be switched. Additionally, although a self calibration technique and an over-the-air calibration technique were described above for implementing the method 300, it will be understood that the method 300 can be implemented using both self calibration and over-the-air calibration. For example, the block 304 could be implemented using self-calibration and the block 308 could be implemented using over-the-air calibration, and vice versa.

Figure 8:
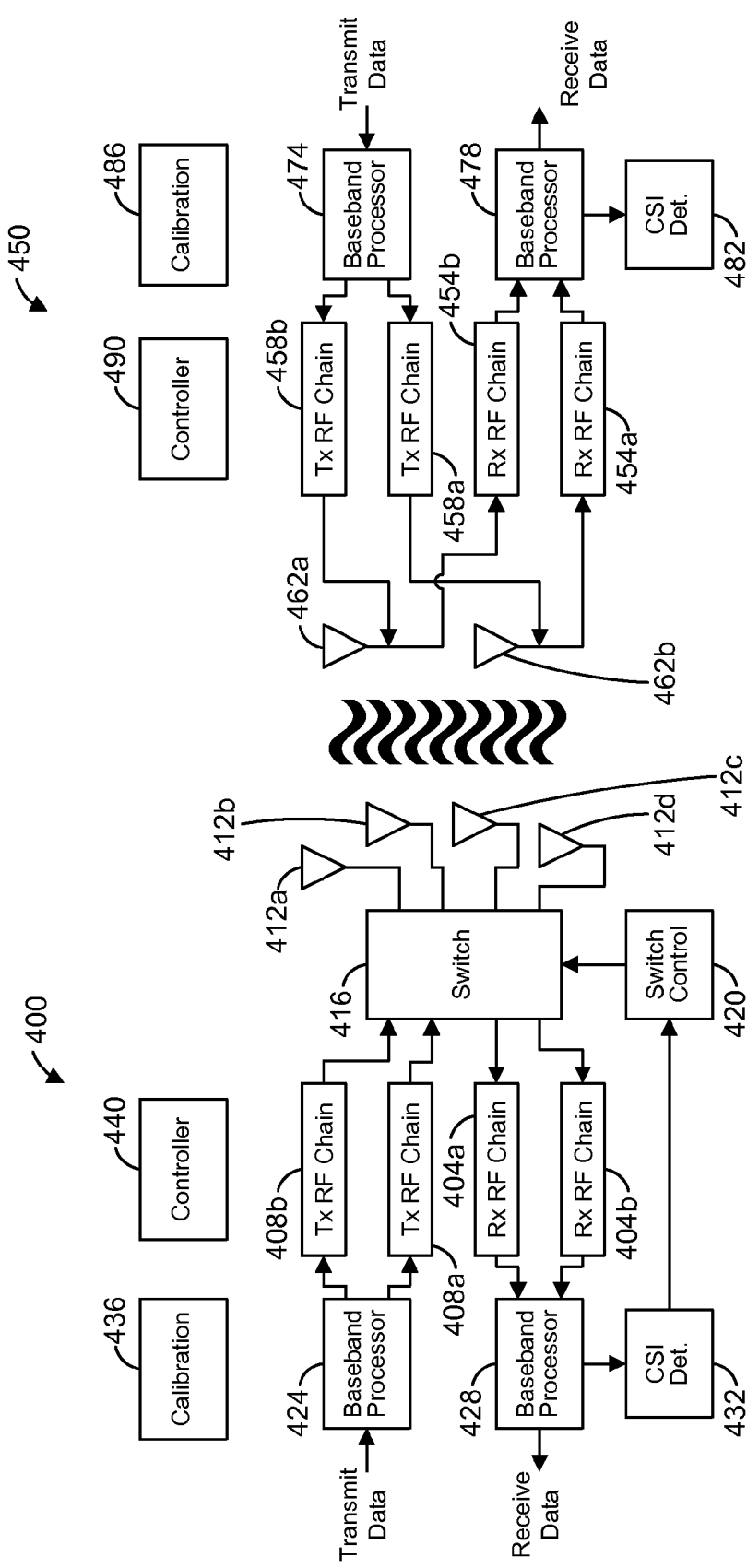
FIG. 8 is a block diagram of an example communication system including a transceiver capable of implementing one or more of the methods of FIGS. 3-7.

FIG. 8 is a block diagram of a communication system including a transceiver 400 and a transceiver 450. The transceiver 400 is capable of antenna selection whereas the transceiver 450 is not capable of antenna selection. In other implementations, however, the transceiver 400 may operate in conjunction with another transceiver that is capable of antenna selection. The transceiver 400 may implement one or more of the implicit ASEL techniques and calibration techniques described above in conjunction with the transceiver 450. Of course, devices other than the transceiver 400 and/or the transceiver 450 may be utilized to implement the implicit ASEL techniques and calibration techniques described above.

The transceiver 400 includes two RX RF chains 404 and two TX RF chains 408. In other implementations, the transceiver 400 may include more than two RX RF chains 404 and more than two TX RF chains 408, as well as a different number of RX RF chains 404 than the number of TX RF chains 408. The transceiver 450 also includes four antennas 412 coupled to the RX RF chains 404 and the TX RF chains 408 via a switch device 416. The switch device 416 generally couples the two RX RF chains 404 to a selected two of the antennas 412, and couples the two TX RF chains 408 to a selected two of the antennas 412. A switch control unit 420, coupled to the switch device 416, controls the switch device 416 to determine which antennas are coupled to the RX RF chains 404 and the TX RF chains 408.

The transceiver 400 also includes a baseband processor 424 that processes data to be transmitted to the transceiver 450 and provides the processed data to the TX RF chains 408. Additionally, transceiver 400 includes a baseband processor 428 that processes signals generated by the RX RF chains 404 and corresponding to data received from the transceiver 450.

A CSI determination unit 432 is coupled to the baseband processor 428 and the switch control unit 420. The CSI determination unit 432 generally may process received control or training signals such as sounding signals and develop therefrom a measured description of the reverse channel between the transceiver 400 and the transceiver 450 by determining or characterizing the propagation effects of the reverse channel on the training signal as it traveled through the reverse channel (i.e., from the transceiver 450 to the transceiver 400).

A calibration unit 436 generally may calculate transmit and/or receive calibration factors such as calibration matrices that may be applied by the baseband processor 424 and/or the baseband processor 428 to data to be transmitted or data received, respectively. A controller 400 generally controls operation of the transceiver 400. The controller 440 may be any desired type of controller and may be implemented as one or more standard multi-purpose, programmable processors, such as micro-processors, as application specific integrated circuits (ASICs), or may be implemented using any other desired types of hardware, and/or processors that execute software and/or firmware instructions.

The switch control unit 420, the baseband processors 424, 428, the CSI determination unit 432, and the calibration unit 436 may be implemented as one or more custom integrated circuits, ASICs, field programmable gate arrays (FPGAs), programmable logic arrays (PLAs), programmable processors, such as micro-processors or digital signal processing processors, or may be implemented using any other desired types of hardware or processors that execute software and/or firmware instructions. Similarly, the RX RF chains 404, the TX RF chains 408, and the switch device 416, may be implemented in hardware, using known or standard hardware for example. If desired, various of the components of the transceiver 400 may be implemented in the same or in different hardware devices, such as in the same or different processors and/or on the same or different integrated circuits. Additionally, routines or instructions that are executed by a processor for implementing the functionality of any of these components that are implemented using a processor that executes software or firmware instructions may be stored in a memory such as a memory included in or coupled to the controller 440 or one or more other memories.

The transceiver 450 includes two RX RF chains 454 and two TX RF chains 458. In other implementations, the transceiver 450 may include more or less RX RF chains 454 and more or less TX RF chains 458, as well as a different number of RX RF chains 454 than the number of TX RF chains 458. The transceiver 450 also includes two antennas 462 coupled to the RX RF chains 454 and the TX RF chains 458

The transceiver 450 also includes a baseband processor 474 that processes data to be transmitted to the transceiver 400 and provides the processed data to the TX RF chains 458. Additionally, transceiver 450 includes a baseband processor 478 that processes signals generated by the RX RF chains 454 and corresponding to data received from the transceiver 400.

A CSI determination unit 482 is coupled to the baseband processor 478. The CSI determination unit 482 generally may process received control or training signals such as sounding signals and develop therefrom a measured description of the forward channel between the transceiver 400 and the transceiver 450 by determining or characterizing the propagation effects of the forward channel on the training signal as it traveled through the forward channel (i.e., from the transceiver 400 to the transceiver 450).

A calibration unit 486 generally may calculate transmit and/or receive calibration factors such as calibration matrices that may be applied by the baseband processor 474 and/or the baseband processor 478 to data to be transmitted or data received, respectively. A controller 490 generally controls operation of the transceiver 450. The controller 490 may be any desired type of controller and may be implemented as one or more standard multi-purpose, programmable processors, such as micro-processors, as application specific integrated circuits (ASICs), or may be implemented using any other desired types of hardware or processors that execute software and/or firmware instructions.

If desired, various of the components of the transceiver 450 may be implemented in the same or in different hardware devices, such as in the same or different processors and/or on the same or different integrated circuits. Additionally, routines or instructions executed by a processor for implementing the functionality of any of these components that are implemented using a processor executing software or firmware instructions may be stored in a memory such as a memory included in or coupled to the controller 490 or one or more other memories.

Operation of the transceiver 400 and the transceiver 450 will now be described with reference to FIGS. 3-7. It will be understood, however, that the transceiver 400 and the transceiver 450 may implement implicit ASEL and calibration techniques different than in FIGS. 3-7.

Referring now to FIGS. 3 and 8, the transceiver 400 may generally act as STA A and the transceiver 450 may generally act as STA B with respect to the method 100. For example, the transceiver 400 may transmit an RX ASEL request to the transceiver 450 (block 104). The switch control unit 420 and/or the controller 440 may cause the transceiver 400 to transmit the RX ASEL request, for instance. When the transceiver 450 transmits the plurality of consecutive RX ASEL sounding data units (block 108), the switch control unit 420 may cause a different subset of the antennas 412 to be coupled to the RX RF chains 404 as each sounding data unit is received.

The CSI determination unit 432 may determine the reverse link CSI based on the received plurality of consecutive RX ASEL sounding data units (block 112), and the switch control unit 420 or some other device, such as the controller 440, may utilize the reverse link CSI to compute the TX ASEL in the forward link (block 116). Similarly, the switch control unit 420 or some other device, such as the controller 440, may utilize the reverse link CSI to compute the RX ASEL in the reverse link (block 120).

Referring now to FIGS. 4 and 8, the transceiver 400 may generally act as STA A and the transceiver 450 may generally act as STA B with respect to the method 150. The switch control unit 420 or some other device, such as the controller 440, may utilize the reverse link CSI to compute both the TX ASEL in the forward link and the RX ASEL in the reverse link (block 154).

Referring now to FIGS. 5 and 8, the transceiver 400 may generally act as STA A and the transceiver 450 may generally act as STA B with respect to the method 200. The switch control unit 420 and/or the controller 440 may cause the transceiver 400 to transmit the plurality of consecutive TX ASEL sounding data units to the transceiver 450, for example (block 204). When the transceiver 400 transmits the plurality of consecutive TX ASEL sounding data units, the switch control unit 420 may cause a different subset of the antennas 412 to be coupled to the TX RF chains 404 as each sounding data unit is transmitted.

The transceiver 450 may compute the CSI on the forward link (i.e., from the transceiver 400 to the transceiver 450). For example, the CSI determination unit 482 may determine the forward link CSI based on the received plurality of consecutive TX ASEL sounding data units (block 208). The transceiver 450 may then transmit the determined forward link CSI to the transceiver 400 (block 212). The controller 490 may cause the forward link CSI to be transmitted to the transceiver 400, for example.

The switch control unit 420 or some other device, such as the controller 440, may utilize the transpose of the forward link CSI to compute the RX ASEL in the reverse link (block 216). Similarly, the switch control unit 420 or some other device, such as the controller 440, may utilize the forward link CSI to compute the TX ASEL in the forward link (block 200).

Referring now to FIGS. 6 and 8, the transceiver 400 may generally act as STA A and the transceiver 450 may generally act as STA B with respect to the method 150. The switch control unit 420 or some other device, such as the controller 440, may utilize the forward link CSI to compute both the TX ASEL in the forward link and the RX ASEL in the reverse link (block 254).

With regard to self-calibration, the calibration unit 436 may compute calibration factors, such as calibration matrices, as described above. The calibration factors generated by the calibration unit 436 may be applied by the baseband processor 424 and/or the baseband processor 428. Additionally or alternatively, calibration factors generated by the calibration unit 436 may be applied by the CSI determination unit 432. For example, the CSI determination unit 432 may apply a calibration matrix to CSI determined by the CSI determination unit 432. The controller 440, the switch control unit 420, and optionally, the calibration unit 436 may act to control the transceiver 400 during a calibration cycle. For example, the controller 400 may cause the transceiver 400 to transmit sounding data units during a calibration cycle, and the switch control unit 420 may cause different subsets of the antennas 412 to be coupled to the TX RF chains 408 during the calibration cycle in which the transceiver 400 transmits sounding data units. Similarly, the switch control unit 420 may cause different subsets of the antennas 412 to be coupled to the RX RF chains 408 during a calibration cycle in which the transceiver 400 receives sounding data units.

Similarly, with regard to over-the-air calibration, the calibration unit 436 may compute calibration factors, such as calibration matrices, as described above. Additionally, the calibration unit 486 of the transceiver 450 may also compute calibration factors, such as calibration matrices, that are applied by the transceiver 450 to signals transmitted to the transceiver 400.

Referring now to FIGS. 7 and 8, the transceiver 400 may generally act as STA A and the transceiver 450 may generally act as STA B with respect to the method 300. The calibration unit 436 in conjunction with the baseband processor 428 and/or the CSI determination unit may perform the first and second calibrations (blocks 304 and 308). In some implementations, a portion of the first and second calibrations may be implemented by the calibration unit 486 and the baseband processor 474.

At least portions of the methods 100, 150, 200, 250, and 300 (or similar methods), may be implemented by hardware. More generally, however, these methods may be implemented using hardware, a processor executing firmware instructions, a processor executing software instructions, or any combination thereof. When a block is implemented at least partially using a processor that executes software instructions, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method in a first communication device configured to (i) transmit data units to a second communication device via a forward link and (ii) receive data units from the second communication device via a reverse link, the method comprising:

transmitting, from the first communication device, a plurality of consecutive sounding data units via the forward link, wherein each consecutive sounding data unit is transmitted via a different subset of antennas;

receiving, at the first communication device, channel state information (CSI) corresponding to the forward link, wherein the CSI corresponding to the forward link was generated (i) at the second communication device and (ii) based on the plurality of consecutive sounding data units transmitted to the second communication device; and determining, at the first communication device, a subset of antennas to use in receiving data units via the reverse link, wherein the subset of antennas to use in receiving data units via the reverse link is determined based on the CSI corresponding to the forward link.

2. A method according to claim 1, further comprising:
prior to transmitting the plurality of consecutive sounding data units via the forward link, transmitting, from the first communication device to the second communication device, a request for the CSI corresponding to the forward link.

3. A method according to claim 1, wherein:
the CSI corresponding to the forward link includes a forward channel estimate; and
determining the subset of antennas to use in the reverse link includes
generating a transpose of the forward channel estimate, and
determining the subset of antennas to use in the reverse link based on the transpose of the forward channel estimate.

4. A method according to claim 1, wherein determining, based on the CSI corresponding to the forward link, a subset of antennas to use in receiving data units via the reverse link includes:
determining, based on calibrated CSI corresponding to the forward link, a subset of antennas to use in receiving data units via the reverse link, wherein the calibrated CSI corresponding to the forward link is calibrated to correct for an imbalance between a transmit radio frequency chain and a receive radio frequency chain.

5. A method according to claim 4, wherein the calibrated CSI corresponding to the forward link is further calibrated to correct for antenna to radio frequency chain imbalances.

6. A method according to claim 1, further comprising determining, based on the CSI corresponding to the forward link, a subset of antennas to use in transmitting data units via the forward link.

7. A method according to claim 6, wherein the subset of antennas to use in receiving data units via the reverse link is determined separately from determining the subset of antennas to use in transmitting data units via the forward link.

8. A method according to claim 6, wherein the subset of antennas to use in transmitting data units via the forward link is the same subset of antennas to be used in receiving data units via the reverse link.

9. An apparatus configured to (i) transmit data units to a communication device via a forward link and (ii) receive data units from the communication device via a reverse link, the apparatus comprising:
 a transceiver configured to
  cause a different subset of antennas to be coupled by a switch device to a set of transmit radio frequency chains as each of a plurality of consecutive sounding data units is transmitted via the forward link,
  receive channel state information (CSI) corresponding to the forward link, wherein the CSI corresponding to the forward link was generated (i) at the communication device and (ii) based on the plurality of consecutive sounding data units transmitted to the communication device, and
  determine, based on the CSI corresponding to the forward link, a subset of antennas to use in receiving data units from the communication device via the reverse link.

10. An apparatus according to claim 9, wherein the transceiver is further configured to:
 prior to transmitting the plurality of consecutive sounding data units via the forward link, transmit to the communication device a request for the CSI corresponding to the forward link.

11. An apparatus according to claim 9, wherein:
 the CSI corresponding to the forward link includes a forward channel estimate; and
 the transceiver is configured to determine the subset of antennas to use in receiving data units from the communication device via the reverse link at least in part by
  generating a transpose of the forward channel estimate, and
  determining the subset of antennas to use in receiving data units from the communication device via the reverse link based on the transpose of the forward channel estimate.

12. An apparatus according to claim 9, wherein the transceiver is configured to determine, based on the CSI corresponding to the forward link, the subset of antennas to use in receiving data units from the communication device via the reverse link at least in part by:
 determining, based on calibrated CSI corresponding to the forward link, the subset antennas to use in receiving data units from the communication device via the reverse link, wherein the calibrated CSI corresponding to the forward link is calibrated to correct for (i) an imbalance between a transmit radio frequency chain and a receive radio frequency chain and (ii) antenna to radio frequency chain imbalances.

13. An apparatus according to claim 9, wherein the transceiver is further configured to:
 determine, based on the CSI corresponding to the forward link, a subset of antennas to use in transmitting data units to the communication device via the forward link.

14. A nontransitory computer-readable medium comprising instructions that, when executed by one or more processors, cause the one or more processors to:
 cause a plurality of consecutive sounding data units to be transmitted via a forward link from a first communication device to a second communication device, wherein each consecutive sounding data unit is transmitted via a different subset of antennas; and
 determine a subset of antennas to use in receiving data units via a reverse link from the second communication device to the first communication device, wherein
  the subset of antennas to use in receiving data units via the reverse link is determined based on CSI corresponding to the forward link, and
  the CSI corresponding to the forward link was generated (i) at the second communication device and (ii) based on the plurality of consecutive sounding data units transmitted to the second communication device.

15. A nontransitory computer-readable medium according to claim 14, wherein the instructions further cause the one or more processors to:
 prior to causing the plurality of consecutive sounding data units to be transmitted via the forward link, cause a request for the CSI corresponding to the forward link to be transmitted to the second communication device.

16. A nontransitory computer-readable medium according to claim 14, wherein:
 the CSI corresponding to the forward link includes a forward channel estimate; and
 the instructions cause the one or more processors to determine the subset of antennas to use in the reverse link at least in part by
  generating a transpose of the forward channel estimate; and
  determining the subset of antennas to use in the reverse link based on the transpose of the forward channel estimate.

17. A nontransitory computer-readable medium according to claim 14, wherein the instructions cause the one or more processors to determine, based on the CSI corresponding to the forward link, the subset of antennas to use in receiving data units via the reverse link at least in part by:
 determining, based on calibrated CSI corresponding to the forward link, the subset of antennas to use in receiving data units via the reverse link, wherein the calibrated CSI corresponding to the forward link is calibrated to correct for an imbalance between a transmit radio frequency chain and a receive radio frequency chain.

18. A nontransitory computer-readable medium according to claim 17, wherein the calibrated CSI corresponding to the forward link is further calibrated to correct for antenna to radio frequency chain imbalances.

19. A nontransitory computer-readable medium according to claim 14, wherein the instructions further cause the one or more processors to:
 determine, based on the CSI corresponding to the forward link, a subset of antennas to use in transmitting data units via the forward link.

20. A nontransitory computer-readable medium according to claim 19, wherein the subset of antennas to use in transmitting data units via the forward link is the same subset of antennas to be used in transmitting data units via the reverse link.

* * * * *